US011869704B2

(12) United States Patent
Someya et al.

(10) Patent No.: US 11,869,704 B2
(45) Date of Patent: Jan. 9, 2024

(54) COIL DEVICE

(71) Applicant: TDK CORPORATION, Tokyo (JP)

(72) Inventors: Shuhei Someya, Tokyo (JP); Aoi Tokiwa, Tokyo (JP); Daisuke Urabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 347 days.

(21) Appl. No.: 17/079,658

(22) Filed: Oct. 26, 2020

(65) Prior Publication Data

US 2021/0166861 A1 Jun. 3, 2021

(30) Foreign Application Priority Data

Nov. 29, 2019 (JP) ................................ 2019-216222

(51) Int. Cl.
*H01F 27/29* (2006.01)
*H01F 27/28* (2006.01)
*H01F 41/064* (2016.01)
*H01F 27/24* (2006.01)

(52) U.S. Cl.
CPC ......... *H01F 27/2828* (2013.01); *H01F 27/24* (2013.01); *H01F 41/064* (2016.01)

(58) Field of Classification Search
CPC ................. H01F 27/2828; H01F 27/24; H01F 2027/065; H01F 17/045; H01F 3/10; H01F 27/29; H01F 27/292
See application file for complete search history.

(56) References Cited

U.S. PATENT DOCUMENTS

2005/0174205 A1* 8/2005 Kitagawa .............. H01F 27/292 336/83
2017/0169935 A1* 6/2017 Miyamoto .............. H01F 19/04
2017/0229232 A1 8/2017 Takagi et al.
2018/0068781 A1* 3/2018 Igarashi .............. H01F 27/2828
2018/0097327 A1* 4/2018 Murakami ................ H01F 5/04
2018/0211763 A1* 7/2018 Komaya ............. H01F 27/2828
2018/0261381 A1* 9/2018 Igarashi .................. H01F 27/32
2019/0089320 A1* 3/2019 Kobayashi ............... H03H 1/00
2019/0148055 A1* 5/2019 Moriya ............... H01F 27/2823 336/83
2019/0272944 A1 9/2019 Takagi et al.
2020/0258677 A1* 8/2020 Igarashi ................ H01F 27/306
2020/0373076 A1* 11/2020 Igarashi .................... H01F 3/10

FOREIGN PATENT DOCUMENTS

JP 2017-139379 A 8/2017
JP 2018-056399 A 4/2018
WO WO-2015045955 A1 * 4/2015 ........... H01F 27/292

* cited by examiner

*Primary Examiner* — Mang Tin Bik Lian
(74) *Attorney, Agent, or Firm* — Oliff PLC

(57) ABSTRACT

A coil device includes a winding core, a wire, and a terminal fitting. The winding core is made of a magnetic material and includes a flange. The wire is wound around the winding core. The terminal fitting is attached to a part of an outer surface of the flange. The terminal fitting includes a contact part and a protrusion plate part. The contact part is contacted with the outer surface of the flange. The protrusion plate part is formed integrally with the contact part and protrudes away from the flange. The protrusion plate part includes a wire connection surface and a main mounting surface. A lead end of the wire is connected to the wire connection surface. The main mounting surface is located opposite to the wire connection surface and is connectable to an external circuit.

8 Claims, 12 Drawing Sheets

COIL DEVICE

BACKGROUND OF THE INVENTION

The present invention relates to a winding-type coil device.

As a winding-type coil device, for example, a coil device shown in Patent Document 1 is known. In the conventional winding-type coil device of Patent Document 1, metal terminals are attached to flanges of a magnetic core using adhesive or so, and an end of a wire constituting a coil is connected at a location dented from a mounting surface of the metal terminal.

When such a coil device with a conventional structure is used for power supply applications, however, the mounting surface of the metal terminal and a connection part of the wire end are away from each other. Thus, there is a problem with increase in DC resistance.

Patent Document 1: JP2018056399 (A)

BRIEF SUMMARY OF INVENTION

The present invention has been achieved under such circumstances. It is an object of the invention to provide a coil device having a low DC resistance and being capable of also being used for power supply applications.

To achieve the above object, a coil device according to the present invention includes:

a winding core made of a magnetic material and including a flange;

a wire wound around the winding core; and a terminal fitting attached to a part of an outer surface of the flange, wherein the terminal fitting includes:

a contact part contacted with the outer surface of the flange; and a protrusion plate part formed integrally with the contact part and protruding away from the flange, and the protrusion plate part includes:

a wire connection surface to which a lead end of the wire is connected; and a main mounting surface located opposite to the wire connection surface and being connectable to an external circuit.

In the coil device according to the present invention, the main mounting surface connected to an external circuit and the wire connection surface for the lead end of the wire are mutually located on the other side of the protrusion plate part. Thus, the wire connection surface and the main mounting surface are substantially close to each other only with the thickness of the protrusion plate part, and it is possible to extremely reduce a DC resistance of the terminal fitting from the connection part of the lead end of the wire to an external circuit board and is also possible to extremely reduce a DC resistance of the coil device as a whole. Thus, the coil device according to the present invention can favorably be used for power supply applications.

Even when the coil device according to the present invention is used for signal system applications, the increase in insertion loss (IL) can be restrained, and the coil device according to the present invention can also favorably be used for signal system applications.

Preferably, the protrusion plate part includes a base part continuing to the contact part and protruding from the flange and a tip bending part bending in turn back manner at a tip of the base part, and a lead end of the wire is sandwiched between the tip bending part and the base part.

When the lead end of the wire is sandwiched between the tip bending part and the base part, the lead end is easily connected to the terminal fitting.

The wire connection surface or the main mounting surface may be formed on a front surface or a rear surface of the tip bending part. Instead, the wire connection surface or the main mounting surface is formed on a front surface or a rear surface of the base part corresponding to the tip bending part. Instead, the protrusion plate part may not include the tip bending part.

Preferably, a sub-mounting surface being flush with the main mounting surface or located on an inner side of the main mounting surface is formed on a part of an outer surface of the contact part. This structure improves the mounting strength of the coil device and makes it easy to stably mount the coil device on a circuit board or so.

Preferably, a gap distance between the protrusion plate part and the flange in a perpendicular direction to the main mounting surface is twice or larger than a thickness of the protrusion plate part at a location where the lead end of the wire is connected to the protrusion plate part. In this structure, for example, the lead end of the wire can easily be connected to the protrusion plate part by laser welding or so. In addition, a thermal deformation stress of a circuit board or so is hard to travel to the flange, and the connection strength of the coil device to the circuit board is improved.

A plate-like member may be bonded on the outer surface of the flange located opposite to the main mounting surface. The plate-like member may be a magnetic member or a nonmagnetic member. In addition, the plate-like member may be a member formed by application of resin. Preferably, such plate-like members have a flat surface. A suction member for pickup can detachably be attached to the flat surface. This improves the handling performance.

DETAILED DESCRIPTION OF INVENTION

Hereinafter, the present invention is explained based on the embodiments shown in the figures.

First Embodiment

Figure 1A:
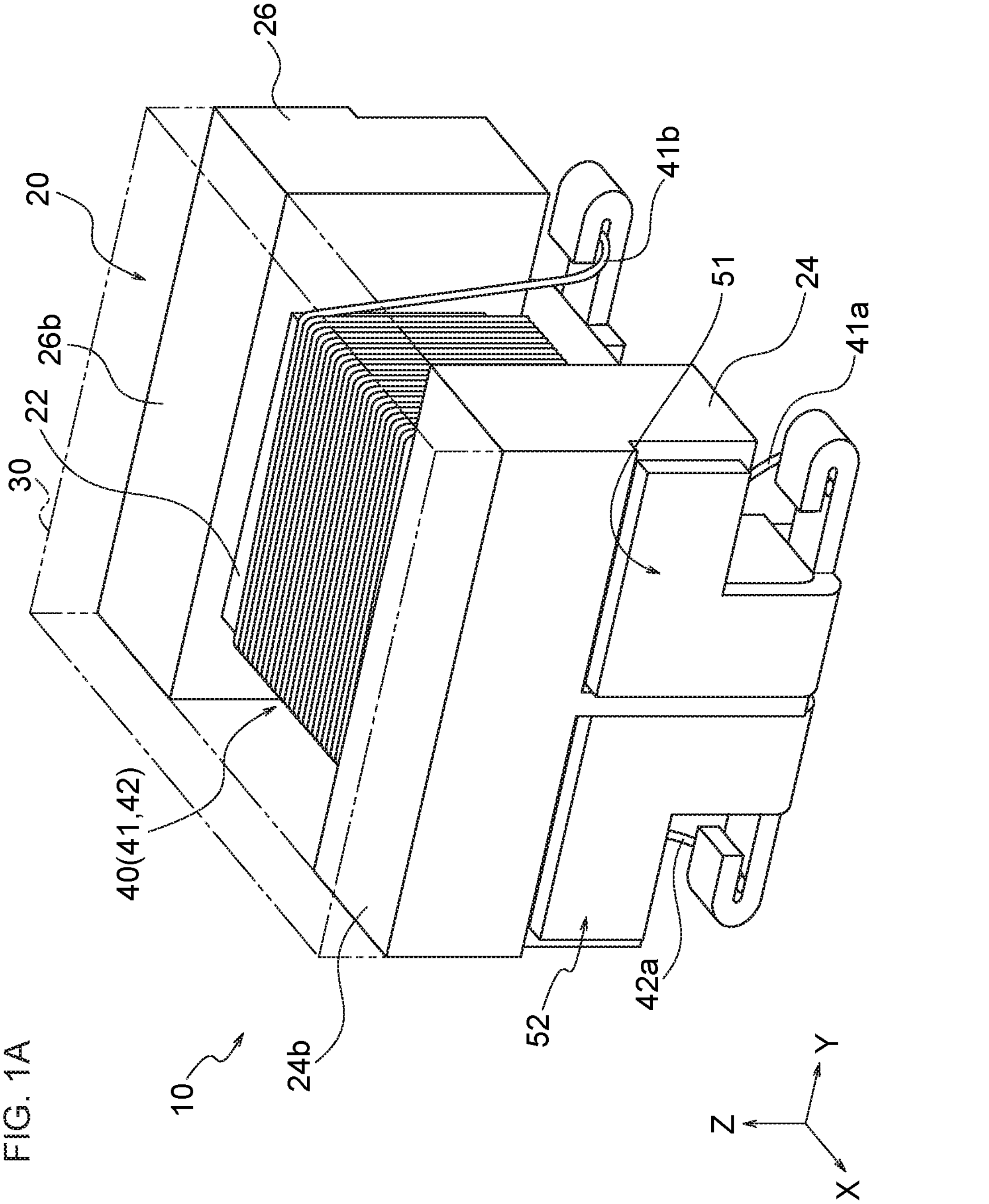
FIG. 1A is a perspective view of a coil device according to an embodiment of the present invention.

A coil device 10 according to an embodiment of the present invention shown in FIG. 1A is used for any purposes and is used as, for example, a winding-type common mode filter. The coil device 10 can also be used as a balun, a dual inductor, etc.

The coil device 10 includes a drum core 20, a coil unit 40 wound around a winding core 22 of the drum core 20, and a flat plate-like member 30 disposed on the drum core 20. In the explanation of the coil device 10, the X-axis direction is a direction parallel to a main mounting surface for the coil device 10 and to the winding axis of the winding core 22 of the drum core 20, the Y-axis direction is a direction parallel to the main mounting surface as similarly to the X-axis and perpendicular to the X-axis, and the Z-axis is a normal direction of the main mounting surface.

Figure 2:
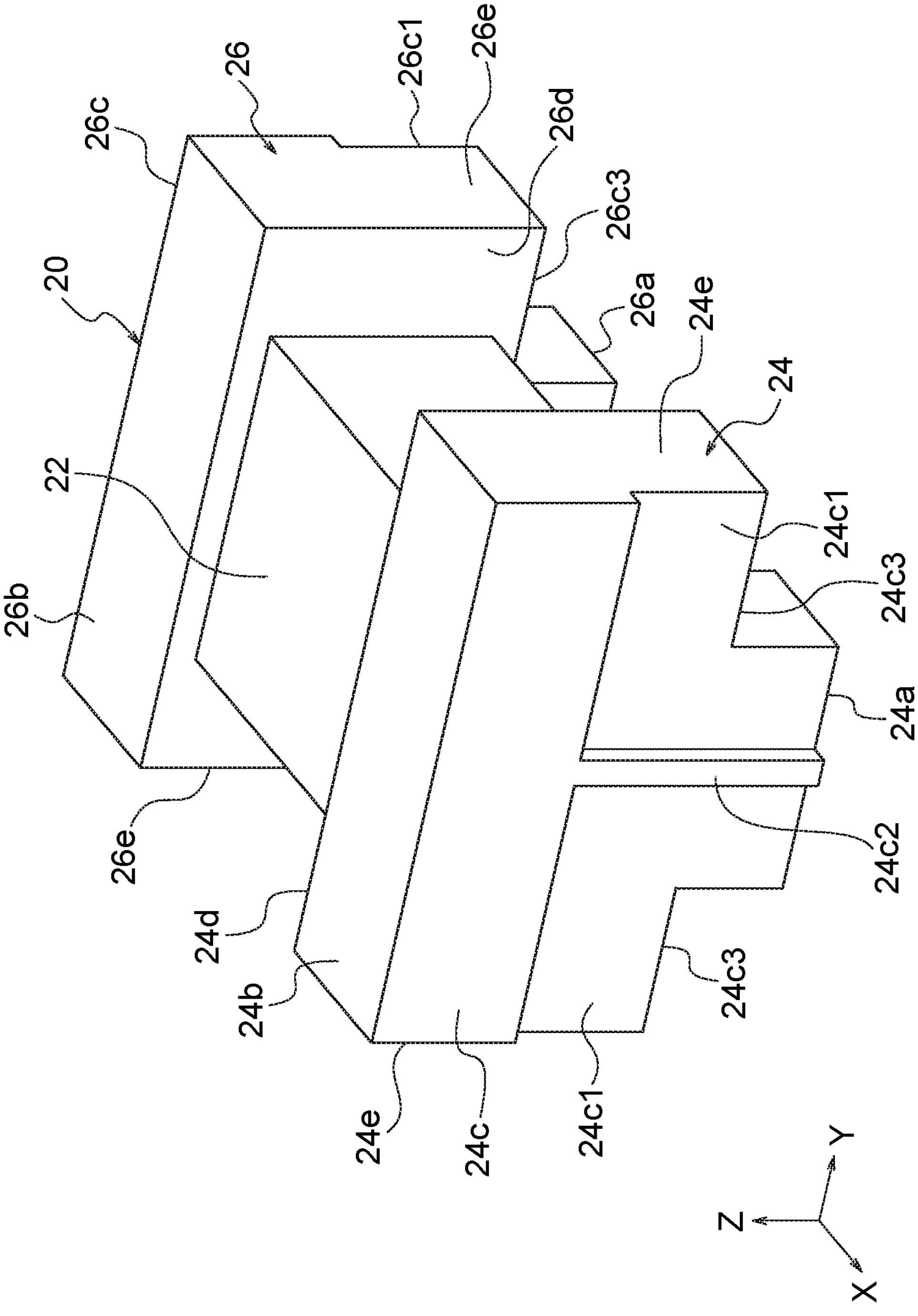
FIG. 2 is a perspective view of a drum-type core of the coil device shown in FIG. 1A.

As shown in FIG. 2, the drum core 20 includes the winding core 22 having a bar shape extending in the X-axis direction and a first flange 24 and a second flange 26 as a pair of core ends arranged on both ends of the winding core 22. The first flange 24 and the second flange 26 have substantially the same shape and are arranged in the winding core 22 so as to substantially be parallel to each other with a predetermined space in the X-axis direction.

The winding core 22 is connected to a substantially central area of each of surfaces of the pair of flanges 24 and 26 facing each other and is integrated with the pair of flanges 24 and 26. In the present embodiment, the winding core 22 has a rectangular cross-sectional shape, but may have any cross-sectional shape, such as circular.

Preferably, a plate-like member 30 shown in FIG. 1A is attached to an upper end of the drum core 20 in the Z-axis direction. Preferably, the plate-like member 30 is attached to an anti-mounting-side core surface 24*b* of the first flange 24 and an anti-mounting-side core surface 26*b* of the second flange 26 so as to bridge these anti-mounting-side core surfaces.

In the present embodiment, as shown in FIG. 2, the first flange 24 is structured by a rectangular parallelepiped as a whole, and rectangular notches 24*c*3 are formed at the lower ends of the rectangular parallelepiped shape on both sides in the Y-axis direction. The first flange 24 includes a mounting-side core surface 24*a* (lower surface in the Z-axis direction), the anti-mounting-side core surface 24*b* located opposite to the mounting-side core surface 24*a*, an outer end surface 24*c* in the X-axis direction, an inner surface 24*d* facing the winding core 22, and a pair of lateral surfaces 24*e* and 24*e* located opposite to each other in the Y-axis direction.

Terminal attachment surfaces 24*c*1 dented inward in the X-axis direction (toward the center of the core 20) from the outer end surface 24*c* are formed at the lower parts of the outer end surface 24*c* on both sides in the Y-axis direction. A terminal insulation projection 24*c*2 is formed between the terminal attachment surfaces 24*c*1 in the Y-axis direction and insulates a first terminal (terminal fitting) 51 and a second terminal (terminal fitting) 52 attached as shown in FIG. 1A. An inner surface of an outer-end-surface contact portion 51*a*1 of a terminal body 51*a* of the first terminal 51 and an inner surface of an outer-end-surface contact portion 52*a*1 of a terminal body 52*a* of the second terminal 52 shown in FIG. 3 are attached (or bonded as necessary) on the terminal attachment surfaces 24*c*1 shown in FIG. 2.

Figure 3:
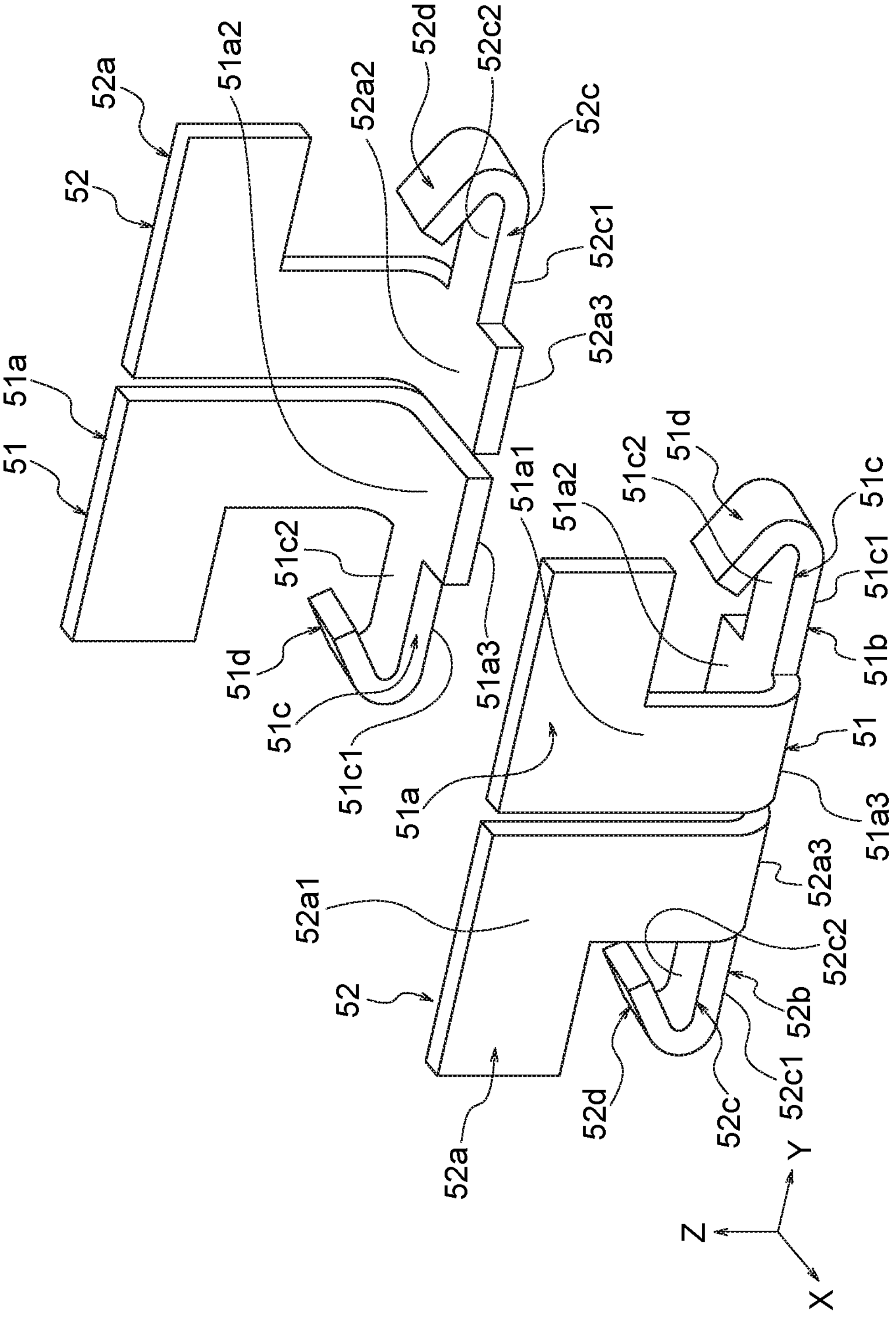
FIG. 3 is a perspective view of a terminal metal fitting of the coil device shown in FIG. 1A.

The step depth of the terminal attachment surfaces 24*c*1 dented from the outer end surface 24*c* shown in FIG. 2 toward the inner side in the X-axis direction is preferably as large as a plate thickness of the first terminal 51 or the second terminal 52 shown in FIG. 3, but may be smaller or larger than the plate thickness. The shape of the first terminal 51 and the shape of the second terminal 52 shown in FIG. 3 are line-symmetric to each other.

The first terminal 51 is structured by a conductive terminal plate or so and includes the terminal body 51*a* and a protrusion plate part 51*b* formed by bending a sheet of conductive plate-like member of a metal plate or so. The terminal body 51*a* includes the outer-end-surface contact portion 51*a*1 with a substantially L shape attached to one terminal attachment surface 24*c*1 formed on the outer end surface 24*c* of the flange 24 shown in FIG. 2 using adhesive or so. In addition, the terminal body 51*a* includes a mounting-side contact portion 51*a*2 with a rectangular plate shape formed by bending from the lower end of the outer-end-surface contact portion 51*a*1 in the Z-axis direction to the X-axis direction.

The outer-end-surface contact portion 51*a*1 of the terminal body 51*a* shown in FIG. 3 is fixed to the terminal attachment surface 24*c*1 of the flange 24 shown in FIG. 2 using adhesive or so. The mounting-side contact portion 51*a*2 shown in FIG. 3 is contacted with the mounting-side core surface 24*a* shown in FIG. 2 with a predetermined space (or no space). The outer surface of the mounting-side contact portion 51*a*2 located opposite to the surface contacted with the mounting-side core surface 24*a* shown in FIG. 2 is a sub-mounting surface 51*a*3. The role of the sub-mounting surface 51*a*3 is mentioned below.

The protrusion plate part 51*b* shown in FIG. 3 and protruding outward in the Y-axis direction from the mounting-side core surface 24*a* of the flange 24 at the lower end of the flange 24 shown in FIG. 2 is formed integrally with the mounting-side contact portion 51*a*2 of the terminal body 51*a* shown in FIG. 3. The protrusion plate part 51*b* includes a base part 51*c* being flush with the mounting-side contact portion 51*a*2 of the terminal body 51*a* and extending outward in the Y-axis direction and a tip bending part 51*d* bending in turn back manner from the tip of the base part 51*c*.

Figure 1B:
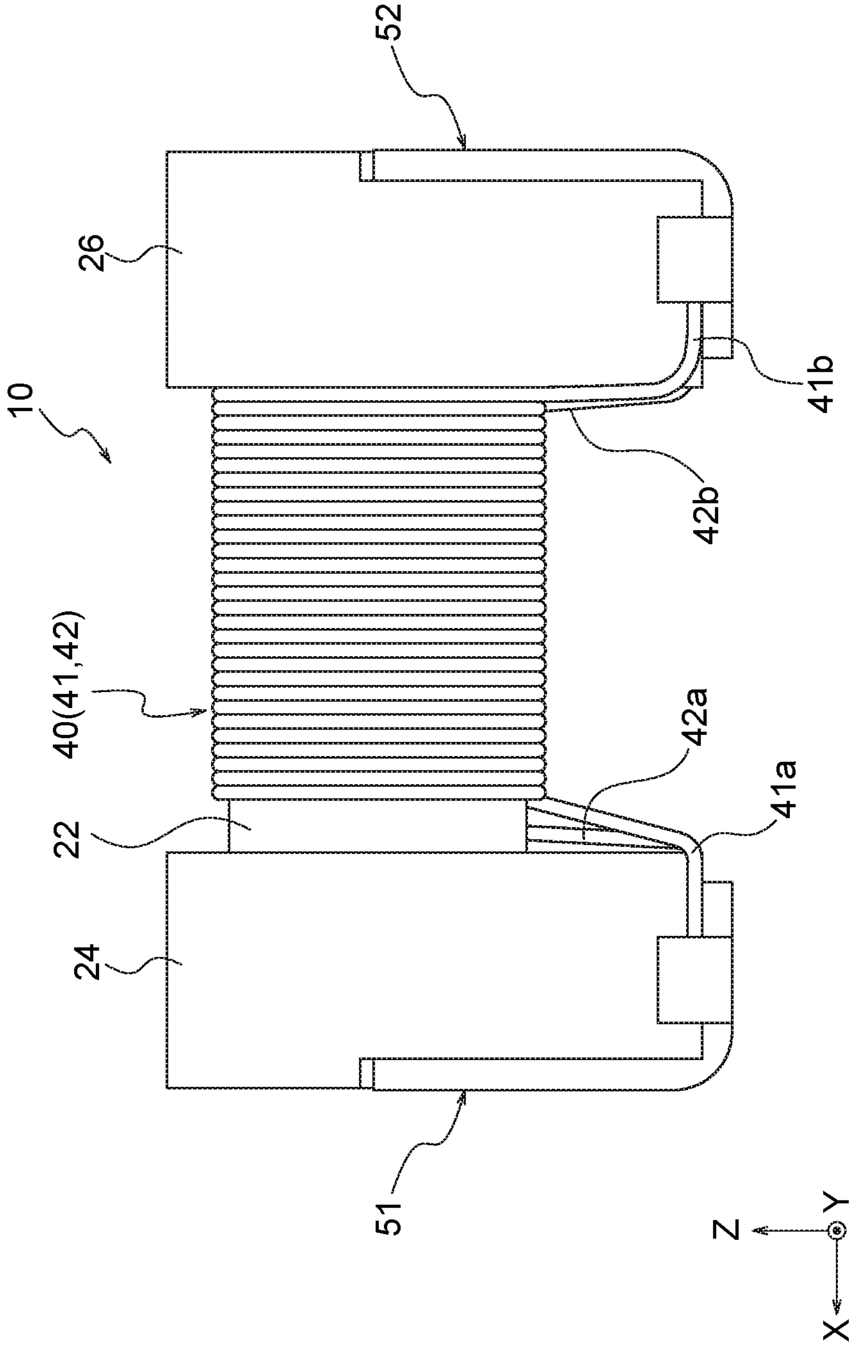
FIG. 1B is a lateral view of the coil device shown in FIG. 1A.
Figure 1C:
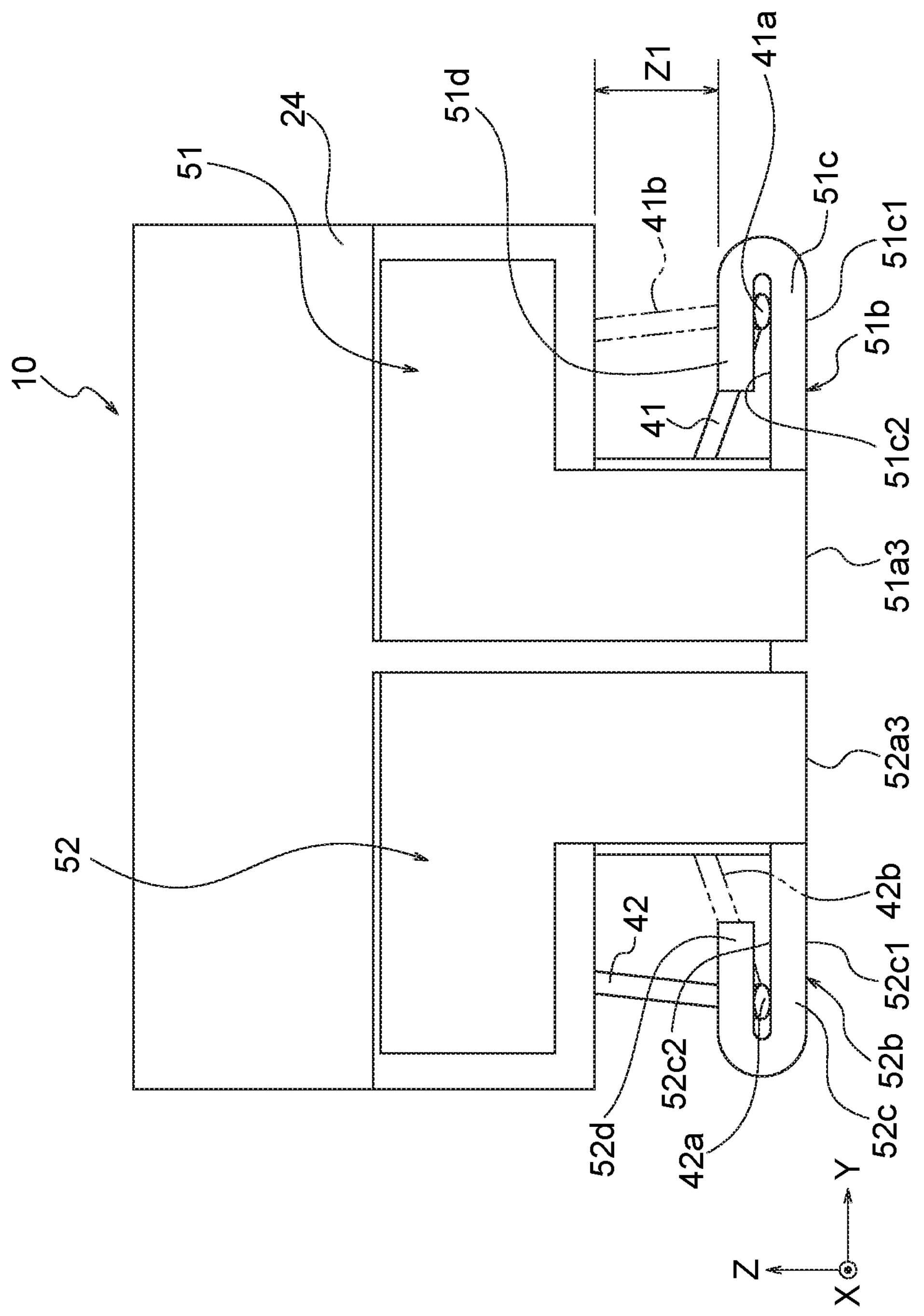
FIG. 1C is a front view of the coil device shown in FIG. 1A.

In the present embodiment, the tip bending part 51*d* bends upward in the Z-axis direction and turns back at the tip of the base part 51*c*, the outer surface of the base part 51*c* located opposite to the tip bending part 51*d* is a main mounting surface 51*c*1, and the inner surface of the base part 51*c*, which the tip bending part 51*d* is located, is a connection surface (wire connection surface) 51*c*2. As shown in FIG. 1C, a lead end 41*a* (one lead end) of a first wire 41 (one wire) constituting the coil unit 40 shown in FIG. 1B is sandwiched and caulked by the connection surface 51*c*2 of the base part 51*c* and the tip bending part 51*d*. After the caulking, the terminal 51 and the lead end 41*a* of the wire 41 may be connected by soldering, laser welding, etc.

In the present embodiment, as shown in FIG. 1C, the main mounting surface 51*c*1 and the sub-mounting surface 51*a*3 of the first terminal 51 are outer surfaces being flush with each other, and the main mounting surface 51*c*1 is mainly connected to a circuit pattern of an external circuit board (not shown), but the sub-mounting surface 51*a*3 may also be connected to the circuit pattern at the same time. The connection to the circuit pattern of the external circuit board is carried out in any manner, such as solder connection.

As with the first terminal 51, the second terminal 52 is structured by a conductive terminal plate or so and includes a terminal body 52*a* and a protrusion plate part 52*b* formed by bending a sheet of conductive plate-like member of a metal plate or so. The terminal body 52*a* includes the outer-end-surface contact portion 52*a*1 with a substantially L shape attached to the other terminal attachment surface 24*c*1 formed on the outer end surface 24*c* of the flange 24 shown in FIG. 2 using adhesive or so. In addition, the terminal body 52*a* includes a mounting-side contact portion 52*a*2 with a rectangular plate shape formed by bending from the lower end of the outer-end-surface contact portion 52*a*1 in the Z-axis direction to the X-axis direction.

The outer-end-surface contact portion 52*a*1 of the terminal body 52*a* shown in FIG. 3 is fixed to the terminal attachment surface 24*c*1 of the flange 24 shown in FIG. 2 using adhesive or so. The mounting-side contact portion 52*a*2 shown in FIG. 3 is contacted with the mounting-side core surface 24*a* shown in FIG. 2 with a predetermined space (or no space). The outer surface of the mounting-side contact portion 52*a*2 located opposite to the surface contacted with the mounting-side core surface 24*a* shown in FIG. 2 is a sub-mounting surface 52*a*3. The role of the sub-mounting surface 52*a*3 is similar to that of the sub-mounting surface 51*a*3.

The protrusion plate part 52*b* shown in FIG. 3 and protruding outward in the Y-axis direction from the mounting-side core surface 24*a* of the flange 24 at the lower end of the flange 24 shown in FIG. 2 is formed integrally with the mounting-side contact portion 52*a*2 of the terminal body 52*a* shown in FIG. 3. The protrusion plate part 52*b* includes a base part 52*c* being flush with the mounting-side contact portion 52*a*2 of the terminal body 52*a* and extending outward in the Y-axis direction and a tip bending part 52*d* bending in turn back manner from the tip of the base part 52*c*.

In the present embodiment, the tip bending part 52*d* bends upward in the Z-axis direction and turns back at the tip of the base part 52*c*, the outer surface of the base part 52*c* located opposite to the tip bending part 52*d* is a main mounting surface 52*c*1, and the inner surface of the base part 52*c*, which the tip bending part 52*d* is located, is a connection surface (wire connection surface) 52*c*2. As shown in FIG. 1C, a lead end 42*a* (one lead end) of a second wire 42 (the other wire) constituting the coil unit 40 shown in FIG. 1B is sandwiched and caulked by the connection surface 52*c*2 of the base part 52*c* and the tip bending part 52*d*. After the caulking, the terminal 52 and the lead end 42*a* of the wire 42 may be connected by soldering, laser welding, etc.

In the present embodiment, as shown in FIG. 1C, the main mounting surface 52*c*1 and the sub-mounting surface 52*a*3 of the second terminal 52 are outer surfaces being flush with each other, and the main mounting surface 52*c*1 is mainly connected to a circuit pattern of an external circuit board (not shown), but the sub-mounting surface 52*a*3 may also be connected to the circuit pattern at the same time. The connection to the circuit pattern of the external circuit board is carried out in any manner, such as solder connection.

In the present embodiment, the second flange 26 has a similar structure to the first flange 24, but may not necessarily have the same structure. In the present embodiment, as shown in FIG. 2, the second flange 26 is structured by a rectangular parallelepiped as a whole, and rectangular notches 26*c*3 are formed at the lower ends of the rectangular parallelepiped on both sides in the Y-axis direction. The second flange 26 includes a mounting-side core surface 26*a* (lower surface in the Z-axis direction), the anti-mounting-side core surface 26*b* located opposite to the mounting-side core surface 26*a*, an outer end surface 26*c* in the X-axis direction, an inner surface 26*d* facing the winding core 22, and a pair of lateral surfaces 26*e* and 26*e* mutually located on the other side in the Y-axis direction.

Terminal attachment surfaces 26*c*1 dented inward in the X-axis direction (toward the center of the core 20) from the outer end surface 26*c* are formed on lower parts of the outer end surface 26*c* on both sides in the Y-axis direction. A terminal insulation projection (not shown; corresponding with the terminal insulation projection 24*c*2) is formed between the terminal attachment surfaces 26*c*1 in the Y-axis direction and insulates the first terminal 51 and the second terminal 52 on the back in the X-axis direction shown in FIG. 3. An inner surface of an outer-end-surface contact portion 51*a*1 of a terminal body 51*a* of the first terminal 51 and an inner surface of an outer-end-surface contact portion 52*a*1 of a terminal body 52*a* of the second terminal 52 shown in FIG. 3 are attached (or bonded as necessary) on the terminal attachment surfaces 26*c*1 shown in FIG. 2.

The attachment structure of the first terminal 51 and the second terminal 52 on the back in the X-axis direction shown in FIG. 3 to the second flange 26 shown in FIG. 2 is similar to that to the first flange 24 shown in FIG. 2 mentioned above and is thereby not explained in detail.

As shown in FIG. 1C, the lead end 41*a* (one leading portion) of the first wire 41 is connected to the connection surface 51*c*2 of the first terminal 51, and the lead end 42*a* (one leading portion) of the second wire 42 is connected to the connection surface 52*c*2 of the second terminal 52. Moreover, the lead end 41*b* (the other leading portion) of the first wire 41 is connected to the connection surface 52*c*2 of the second terminal 52 on the back in the X-axis direction shown in FIG. 3, and the lead end 42*b* (the other leading portion) of the second wire 42 shown in FIG. 1C is connected to the connection surface 51*c*2 of the first terminal 51 on the back in the X-axis direction shown in FIG. 3. These are connected by any method, such as welding, resistance welding, ultrasonic welding, caulking, thermocompression bonding, and heat welding (preferably, laser welding, soldering, etc.).

Figure 1D:
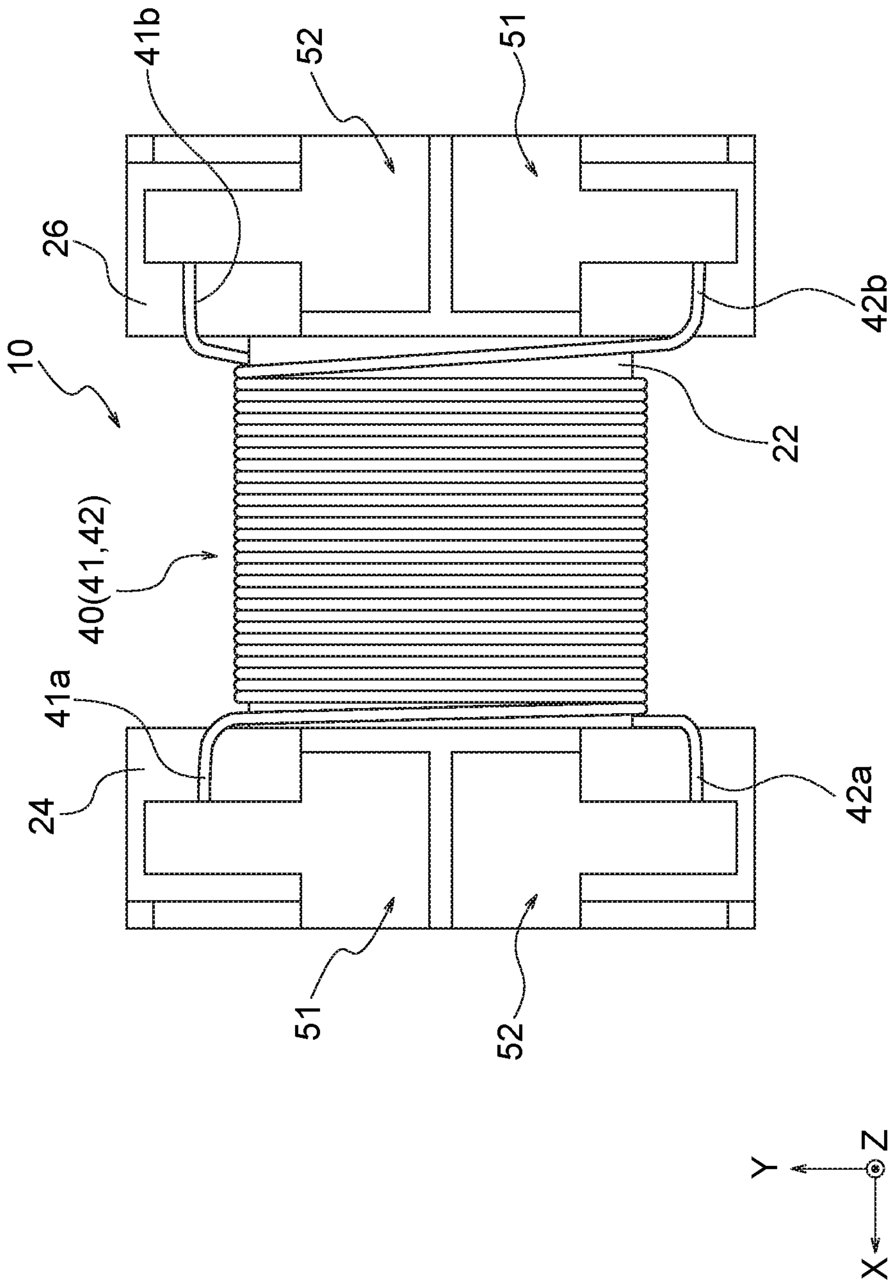
FIG. 1D is a bottom view of the coil device shown in FIG. 1A.

As shown in FIG. 1A, FIG. 1B, and FIG. 1D, the coil unit 40 is formed around the winding core 22 of the drum core 20. In the present embodiment, the coil unit 40 is structured by two wires 41 and 42. The wires 41 and 42 are structured by, for example, a coated wire formed by covering a core made of a good conductor (e.g., copper wire) with an insulating coverage film and are wound around the winding core 22, for example, in a double-layer structure. In the present embodiment, the cross-sectional areas of conductive parts of the wires 41 and 42 are the same as each other.

In the present embodiment, the first wire 41 and the second wire 42 are wound around the winding core 22 by a normal bifilar winding, but a cross part may be formed at a predetermined location in the winding axis of the winding core 22.

In the manufacture of the coil device 10, two pairs of terminals 51 and 52 shown in FIG. 3 are initially attached to the drum core 20 shown in FIG. 2. Preferably, only the inner surfaces of the outer-end-surface contact portions 51*a*1 and 52*a*1 of the terminals 51 and 52 are bonded with the terminal attachment surfaces 24*c*1 or 26*c*1. Preferably, the mounting-side contact portions 51*a*2 and 52*a*2 of the terminals 51 and 52 are not bonded with the mounting-side core surface 24*a* (26*a*) of the flange 24 (26). This is because a vibration of an external circuit board not shown is prevented from directly traveling to the mounting-side core surface 24*a* (26*a*) of the flange 24 (26).

Prepared are the drum-type drum core 20 with the terminals 51 and 52 manufactured in such a manner, the flat plate-like member 30, and the wires 41 and 42. The drum core 20 is made of magnetic material and can be manufactured by, for example, pressing and sintering a magnetic material with a comparatively high permeability (e.g., Ni—Zn based ferrite, Mn—Zn based ferrite) or a magnetic powder composed of metal magnetic material or so. The flat plate-like member 30 is preferably made of the same or different magnetic material from the drum core 20, but is not necessarily made of magnetic material.

The terminals 51 and 52 are structured by a metal terminal made of phosphor bronze, tough pitch steel, pure copper, brass, silver, gold, metallic alloys with solder bondability, etc. Each of the terminals 51 and 52 has any thickness, but preferably has a thickness of 50-300 μm.

For example, the wires 41 and 42 can be formed by covering a core made of a good conductor of copper (Cu) or so with an insulating material made of imide-modified polyurethane or so and further covering the outermost surface with a thin resin film of polyester or so. The drum core 20 on which the terminals 51 and 52 are installed and the wires 41 and 42 are set to a winding machine, and the wires 41 and 42 are wound around the winding core 22 of the drum core 20 in a predetermined order. Each of the wires 41 and 42 has any diameter, but preferably has a diameter of 10-300 μm.

In the present embodiment, the first wire 41 and the second wire 42 are wound by bifilar winding. The lead ends 41*a*, 42*a*, 41*b*, and 42*b* of the lead portions (wire ends) of the wound wires 41 and 42 are connected after the tip bending part 51*d* or 52*d* is caulked to the connection surface 51*c*2 or 52*c*2 of the predetermined terminals 51 and 52 shown in FIG. 3.

After the winding operation of the wires 41 and 42 to the winding core 22, the flat plate-like member 30 is connected to the anti-mounting-side core surfaces 24*b* and 26*b* of the flanges 24 and 26 by any method, such as adhesion.

In the coil device 10 according to the present embodiment, the wire length of the lead end 41*a* (one lead portion) of the first wire 41 from the coil unit 40 to the connection surface 51*c*2 of the first terminal 51 and the wire length of the lead end 42*a* (one lead portion) of the second wire 42 from the coil unit 40 to the connection surface 52*c*2 of the second terminal 52 are preferably substantially the same, but may be different from each other. Preferably, the winding number of the first wire 41 and the winding number of the second wire 42 in the coil unit 40 are the same as each other. This structure further improves mode conversion characteristics.

In the coil device 10 according to the present embodiment, as shown in FIG. 1C, the main mounting surface 51*c*1 (52*c*1) of the terminal 51 (52) and the connection surface 51*c*2 (52*c*2), which is a wire connection surface for the lead end 41*a* (42*a*) of the wire 41 (42), are mutually located on the other side of the base part 51*c* (52*c*). Thus, the connection surface 51*c*2 (52*c*2) and the main mounting surface 51*c*1 (52*c*1) are substantially close to each other only with the thickness of the base part 51*c* (52*c*) of the protrusion plate part 51*b* (52*b*), and it is possible to extremely reduce a DC resistance of the terminal 51 (52) from the connection part of the lead end 41*a* (42*a*) of the wire 41 (42) to an external circuit board (not shown). Thus, it is also possible to extremely reduce a DC resistance of the coil device 10 as a whole.

As a result, the coil device 10 according to the present embodiment can also favorably be used for power supply applications. Even when the coil device 10 according to the present embodiment is used for signal system applications, the increase in insertion loss (IL) can be restrained, and the coil device 10 according to the present embodiment can also favorably be used for a high frequency signal system application of, for example, 100 MHz or more.

In the present embodiment, the contact part of the terminal 51 (52) made of metal plate is partly contacted with a part of the flange 24 (26) of the drum core 20 (excluding the mounting-side core surface 24*a* (26*a*)), and a vibration, a thermal deformation force, or the like from an external circuit board is thereby hard to directly travel to the drum core. As a result, the connection strength of the coil device 10 to an external circuit board is improved.

In the present embodiment, as shown in FIG. 3, the protrusion plate part 51*b* (52*b*) includes the base part 51*c* (52*c*) shown in FIG. 3 continuing to the mounting-side contact portion 51*a*2 (52*a*2) of the terminal body 51*a* (52*a*) and protruding from the flange 24 (26) shown in FIG. 2. As shown in FIG. 3, the protrusion plate part 51*b* (52*b*) includes the tip bending part 51*d* (52*d*) bending in turn back manner at the tip side of the protrusion plate part 51*b* (52*b*). Then, as shown in FIG. 1C, the lead end 41*a* (42*a*) (41*b*, 42*b*) of the wire 41 (42) is sandwiched and caulked between the base part 51*c* (52*c*) and the tip bending part 51*d* (52*d*). When the lead end 41*a* (42*a*) (41*b*, 42*b*) of the wire 41 (42) is sandwiched between the base part 51*c* (52*c*) and the tip bending part 51*d* (52*d*) in such a manner, the lead end 41*a* (42*a*) is easily connected to the terminal 51 (52).

In the present embodiment, the sub-mounting surface 51*a*3 (52*a*3) being flush with the main mounting surface 51*c*1 (52*c*2) or located on the inner side of the main mounting surface 51*c*1 (52*c*2) is formed on the outer surface of the mounting-side contact portion 51*a*2 (52*a*2) of the terminal 51 (52). This structure improves the mounting strength of the coil device 10 and makes it easy to stably mount the coil device 10 on a circuit board (not shown) or so.

In the present embodiment, as shown in FIG. 1C, a gap distance Z1 between the tip bending part 51*d* (52*d*) of the protrusion plate part 51*b* (52*b*) and the flange 24 (26) at a connection location of the lead end 41*a* (42*a*) of the wire 41 (42) in the Z-axis direction perpendicular to the main mounting surface 51*c*1 (52*c*2) is twice or larger than a thickness of the protrusion plate part 51*b* (52*b*). In this structure, for example, the lead end 41*a* (42*a*) of the wire 41 (42) can easily be connected to the protrusion plate part 51*b* (52*b*) by laser welding, soldering, or the like. In addition, a thermal deformation stress of a circuit board (not shown) or so is hard to travel to the flanges, and the connection strength of the coil device 10 to the circuit board is improved.

In the present embodiment, as shown in FIG. 1A, the coil device 10 according to the present embodiment further includes the flat plate-like member 30 bridging the anti-mounting-side core surface 24*b* of the first flange 24 and the anti-mounting-side core surface 26*b* of the second flange 26. When the flat plate-like member 30 is made of magnetic material, a closed magnetic circuit can be formed by combination with the drum core 20 made of magnetic material, and magnetic characteristics of the coil device 10 are improved.

Incidentally, the plate-like member 30 may be a nonmagnetic member. In addition, the plate-like member 30 may be a member formed by application of resin. Preferably, such plate-like members 30 have a flat surface. A suction member for pickup can detachably be attached to the flat surface. This improves the handling performance.

Second Embodiment

A coil device according to Second Embodiment of the present invention is different from the coil device 10 according to First Embodiment only in the following structure and demonstrates effects similar to those of First Embodiment. The overlapping matters with First Embodiment are not explained. In the figures, common components with First Embodiment are given common references.

Figure 4A:
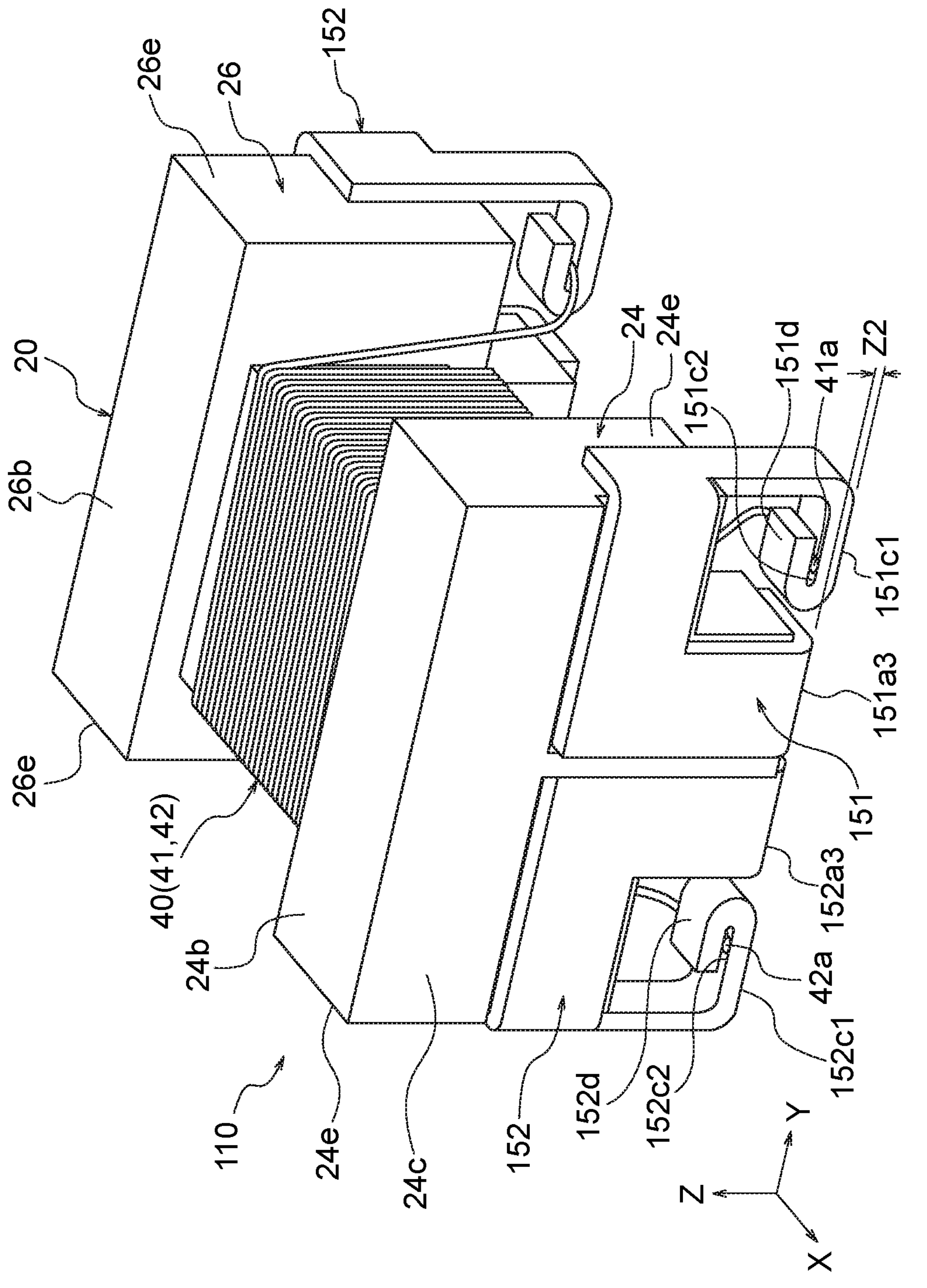
FIG. 4A is a perspective view of a coil device according to another embodiment of the present invention.
Figure 5:
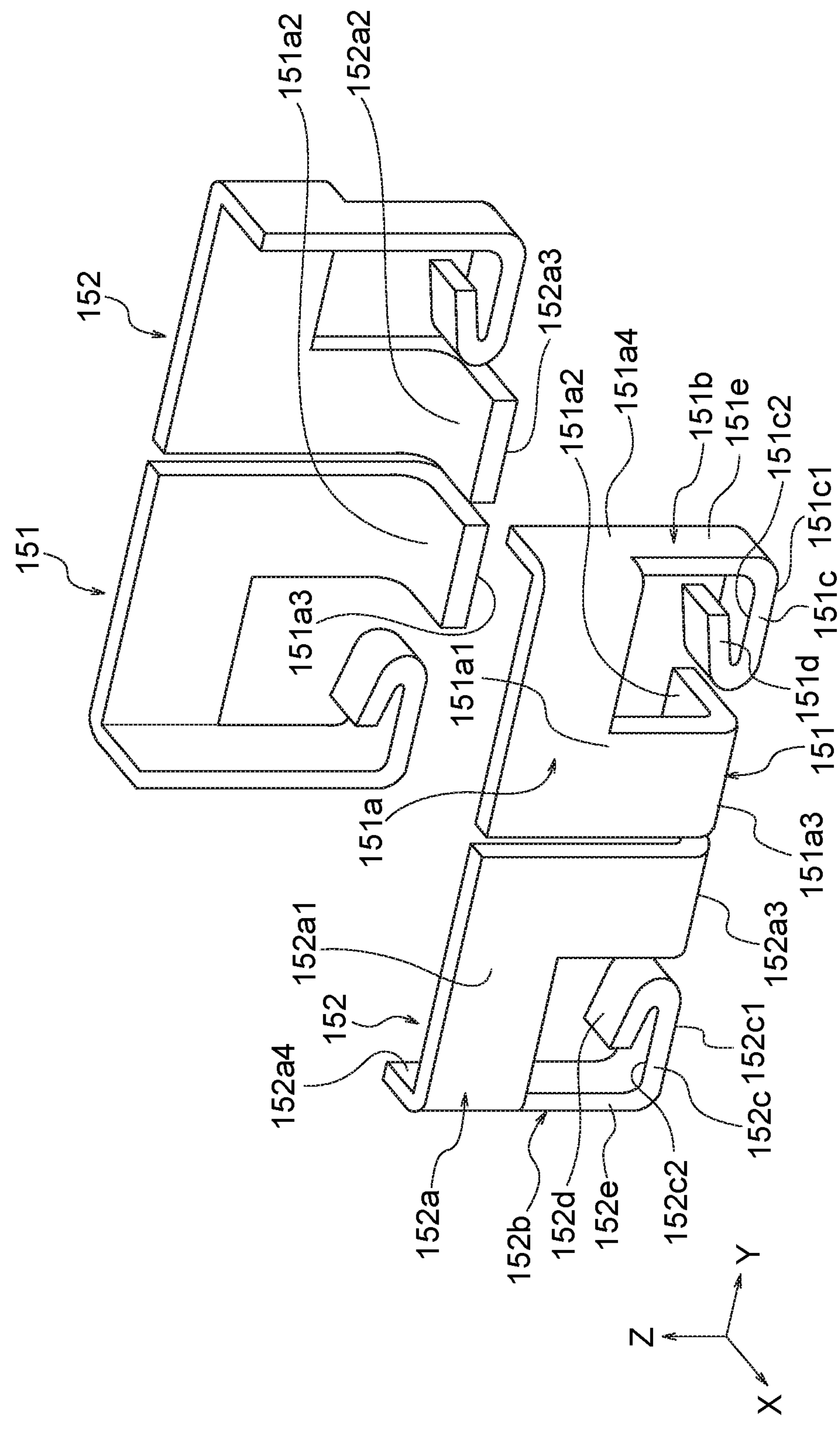
FIG. 5 is a perspective view of a terminal metal fitting of the coil device shown in FIG. 4A.

In a coil device 110 according to the present embodiment, as shown in FIG. 4A and FIG. 5, the first terminal 51 and the second terminal 52 of the coil device 10 according to First Embodiment shown in FIG. 1A to FIG. 3 are respectively replaced with a first terminal 151 and a second terminal 152.

The first terminal 151 shown in FIG. 5 is structured by a conductive terminal plate or so and includes a terminal body 151*a* and a protrusion plate part 151*b* formed by bending a sheet of conductive plate-like member of a metal plate or so. The terminal body 151*a* includes an outer-end-surface contact portion 151*a*1 attached to one terminal attachment surface 24*c*1 formed on the outer end surface 24*c* of the flange 24 shown in FIG. 2 using adhesive or so. In addition, the terminal body 151*a* includes a mounting-side contact portion 151*a*2 with a rectangular plate shape formed by bending from the lower end of the outer-end-surface contact portion 151*a*1 in the Z-axis direction to the X-axis direction.

The outer-end-surface contact portion 151*a*1 of the terminal body 151*a* shown in FIG. 5 is fixed to the terminal attachment surface 24*c*1 of the flange 24 shown in FIG. 2 using adhesive or so. The mounting-side contact portion 151*a*2 shown in FIG. 5 is contacted with the mounting-side core surface 24*a* shown in FIG. 2 with a predetermined space (or no space). The outer surface of the mounting-side contact portion 151*a*2 located opposite to the surface contacted with the mounting-side core surface 24*a* shown in FIG. 2 is a sub-mounting surface 151*a*3. The role of the sub-mounting surface 151*a*3 is mentioned below.

A lateral contact portion 151*a*4 contacted with a lower part of the lateral surface 24*e* of the flange 24 shown in FIG. 2 (see FIG. 5) is formed integrally with an outer end of the outer-end-surface contact portion 151*a*1 of the terminal body 151*a* in the Y-axis direction shown in FIG. 5. As shown in FIG. 5, the protrusion plate part 151*b* protruding downward in the Z-axis direction from the lateral surface 24*e* of the flange 24 shown in FIG. 2 is formed integrally with the terminal body 151*a* at a lower part of the lateral contact portion 151*a*4 in the Z-axis direction.

The protrusion plate part 151*b* includes a first base part 151*e* being flush with the lateral contact portion 151*a*4 of the terminal body 151*a* and extending downward in the Z-axis direction, a second base part 151*c* formed integrally and bending inward in the Y-axis direction from the lower end of the first base part 151*e* in the Z-axis direction, and a tip bending part 151*d* bending in turn back manner from the tip of the second base part 151*c*.

In the present embodiment, the tip bending part 151*d* bends outward in the Y-axis direction and turns back at the tip of the second base part 151*c*, the outer surface of the second base part 151*c* located opposite to the tip bending part 151*d* is a main mounting surface 151*c*1, and the inner surface of the second base part 151*c*, where the tip bending part 151*d* is located, is a connection surface (wire connection surface) 151*c*2. As shown in FIG. 4A, a lead end 41*a* (one lead end) of the first wire 41 (one wire) constituting the coil unit 40 is sandwiched and caulked by the connection surface 151*c*2 of the second base part 151*c* and the tip bending part 151*d*. After the caulking, the terminal 151 and the lead end 41*a* of the wire 41 may be connected by soldering, laser welding, etc.

In the present embodiment, the main mounting surface 151*c*1 of the first terminal 151 protrudes downward in the Z-axis direction from the sub-mounting surface 151*a*3 by a predetermined distance Z2. Preferably, the predetermined distance Z2 is larger than zero and is about four times or less (more preferably, twice or less) of the thickness of the plate-like member constituting the first terminal 151. In the present embodiment, the main mounting surface 151*c*1 is mainly connected to a circuit pattern of an external circuit board (not shown), but the sub-mounting surface 151*a*3 may also be connected to the circuit pattern at the same time. The connection to the circuit pattern of the external circuit board is carried out in any manner, such as solder connection.

As with the first terminal 151, the second terminal 152 shown in FIG. 5 is also structured by a conductive terminal plate or so and includes a terminal body 152*a* and a protrusion plate part 152*b* formed by bending a sheet of conductive plate-like member of a metal plate or so. The terminal body 152*a* includes an outer-end-surface contact portion 152*a*1 attached to the other terminal attachment surface 24*c*1 formed on the outer end surface 24*c* of the flange 24 shown in FIG. 2 using adhesive or so. In addition, the terminal body 152*a* includes a mounting-side contact portion 152*a*2 with a rectangular plate shape formed by bending from the lower end of the outer-end-surface contact portion 152*a*1 in the Z-axis direction to the X-axis direction.

The outer-end-surface contact portion 152*a*1 of the terminal body 152*a* shown in FIG. 5 is fixed to the terminal attachment surface 24*c*1 of the flange 24 shown in FIG. 2 using adhesive or so. The mounting-side contact portion 152*a*2 shown in FIG. 5 is contacted with the mounting-side core surface 24*a* shown in FIG. 2 with a predetermined space (or no space). The outer surface of the mounting-side contact portion 152*a*2 shown in FIG. 5 and located opposite to the surface contacted with the mounting-side core surface 24*a* shown in FIG. 2 is a sub-mounting surface 152*a*3. The role of the sub-mounting surface 152*a*3 is similar to that of the sub-mounting surface 151*a*3.

A lateral contact portion 152*a*4 contacted with a lower part of the lateral surface 24*e* of the flange 24 shown in FIG. 2 (see FIG. 5) is formed integrally with an outer end of the outer-end-surface contact portion 152*a*1 of the terminal body 152*a* in the Y-axis direction shown in FIG. 5. As shown in FIG. 5, the protrusion plate part 152*b* protruding downward in the Z-axis direction from the lateral surface 24*e* of the flange 24 shown in FIG. 2 is formed integrally with the terminal body 152*a* at a lower part of the lateral contact portion 152*a*4 in the Z-axis direction.

The protrusion plate part 152*b* includes a first base part 152*e* being flush with the lateral contact portion 152*a*4 of the terminal body 152*a* and extending downward in the Z-axis direction, a second base part 152*c* formed integrally and bending inward in the Y-axis direction from the lower end of the first base part 152*e* in the Z-axis direction, and a tip bending part 152*d* bending in turn back manner from the tip of the second base part 152*c*.

In the present embodiment, the tip bending part 152*d* bends outward in the Y-axis direction and turns back at the tip of the second base part 152*c*, the outer surface of the second base part 152*c* located opposite to the tip bending part 152*d* is a main mounting surface 152*c*1, and the inner surface of the second base part 152*c*, where the tip bending part 152*d* is located, is a connection surface (wire connection surface) 152*c*2. As shown in FIG. 4A, a lead end 42*a* (one lead end) of the second wire 42 (the other wire) constituting the coil unit 40 is sandwiched and caulked by the connection surface 152*c*2 of the second base part 152*c* and the tip bending part 152*d*. After the caulking, the terminal 152 and the lead end 42*a* of the wire 42 may be connected by soldering, laser welding, etc.

In the present embodiment, the main mounting surface 152*c*1 of the second terminal 152 protrudes downward in the Z-axis direction from the sub-mounting surface 152*a*3 by a predetermined distance Z2. In the present embodiment, the main mounting surface 152*c*1 is mainly connected to a circuit pattern of an external circuit board (not shown), but the sub-mounting surface 151*a*3 may also be connected to the circuit pattern at the same time. The connection to the circuit pattern of the external circuit board is carried out in any manner, such as solder connection.

The coil device 110 according to the present embodiment also demonstrates effects similar to those of the coil device 10 according to First Embodiment. In particular, in the coil device 110, the second base part 151*c* (152*c*), where the main mounting surface 151*c*1 (152*c*1) of the terminal 151 (152) is formed, and the lateral contact portion 151*a*4 (152*a*4) are connected integrally by the first base part 151*e* (152*e*) (leaf spring-like support). Thus, even if an external circuit board (not shown) connected to the main mounting surface 151*c*1 (152*c*1) bends or vibrates due to external force, thermal deformation, or the like, the deformation of the first base part 151*e* (152*e*) absorbs the deformation (force) or the vibration and can effectively protect the coil device 110.

Third Embodiment

A coil device according to Third Embodiment of the present invention is different from the coil device 110 according to Second Embodiment only in the following structure and demonstrates effects similar to those of Second Embodiment. The overlapping matters with Second Embodiment are not explained. In the figures, common components with First and Second Embodiments are given common references.

Figure 4B:
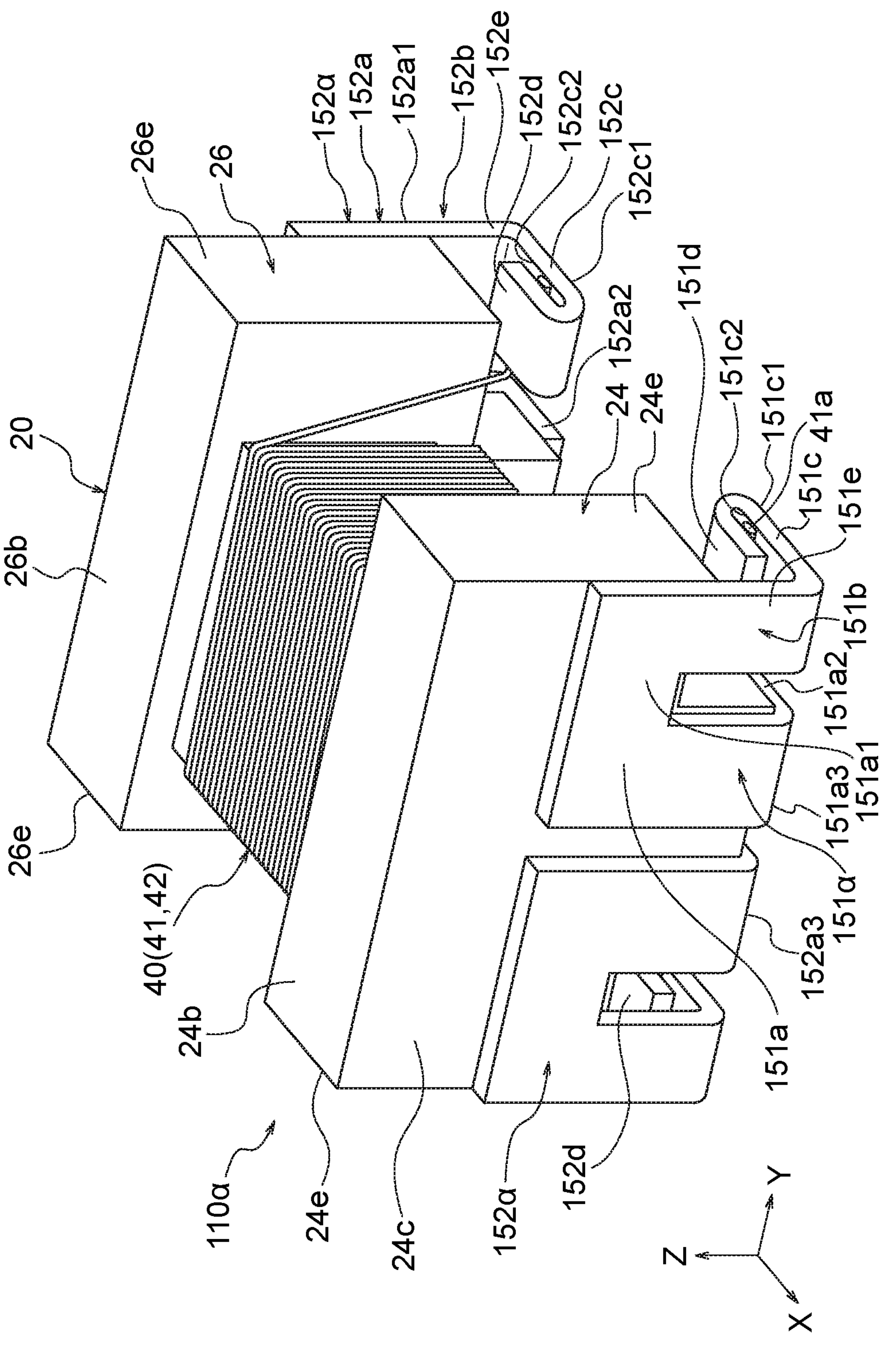
FIG. 4B is a perspective view of a coil device according to a modified example of FIG. 4A.

In a coil device 110α according to the present embodiment, as shown in FIG. 4B, a first terminal 151 and a second terminal 152 shown in FIG. 4A are respectively replaced with a first terminal 151α and a second terminal 152α.

The first terminal 151α shown in FIG. 4B is structured by a conductive terminal plate or so and includes a terminal body 151*a* and a protrusion plate part 151*b* formed by bending a sheet of conductive plate-like member of a metal plate or so. The terminal body 151*a* includes the outer-end-surface contact portion 151*a*1 attached to one terminal attachment surface formed on the outer end surface 24*c* of the flange 24 shown in FIG. 2 using adhesive or so. In addition, the terminal body 151*a* includes a mounting-side contact portion 151*a*2 with a rectangular plate shape formed by bending from the lower end of the outer-end-surface contact portion 151*a*1 in the Z-axis direction to the X-axis direction.

In the present embodiment, the lateral contact portion 151*a*4 shown in FIG. 5 is not formed, and as shown in FIG. 4B, the protrusion plate part 151*b* protruding downward in the Z-axis direction from an outer part of the outer-end-surface contact portion 151*a*1 in the Y-axis direction is formed integrally with the terminal body 151*a*.

The protrusion plate part 151*b* includes a first base part 151*e* being flush with the outer-end-surface contact portion 151*a*1 of the terminal body 151*a* and extending downward in the Z-axis direction, a second base part 151*c* formed integrally and bending inward in the X-axis direction from the lower end of the first base part 151*e* in the Z-axis direction, and a tip bending part 151*d* bending in turn back manner from the tip of the second base part 151*c*.

In the present embodiment, the tip bending part 151*d* bends outward in the X-axis direction and turns back at the tip of the second base part 151*c*, the outer surface of the second base part 151*c* located opposite to the tip bending part 151*d* is a main mounting surface 151*c*1, and the inner surface of the second base part 151*c*, where the tip bending part 151*d* is located, is a connection surface (wire connection surface) 151*c*2. As shown in FIG. 4B, a lead end 41*a* (one lead end) of the first wire 41 (one wire) constituting the coil unit 40 is sandwiched and caulked by the connection surface 151*c*2 of the second base part 151*c* and the tip bending part 151*d*. After the caulking, the terminal 151 and the lead end 41*a* of the wire 41 may be connected by soldering, laser welding, etc.

As with the first terminal 151α, the second terminal 152α shown in FIG. 4B is also structured by a conductive terminal plate or so and includes a terminal body 152*a* and a protrusion plate part 152*b* formed by bending a sheet of conductive plate-like member of a metal plate or so. The second terminal 152α is structured in line-symmetric manner to the first terminal 151α based on the Z-axis and the X-axis. That is, the terminal body 152*a*, the outer-end-surface contact portion 152*a*1, the mounting-side contact portion 152*a*2, the sub-mounting surface 152*a*3, the protrusion plate part 152*b*, the second base part 152*c*, the main mounting surface 152*c*1, the connection surface 152*c*2, and the tip bending part 152*d* of the first terminal 151α correspond with the terminal body 151*a*, the outer-end-surface contact portion 151*a*1, the mounting-side contact portion 151*a*2, the sub-mounting surface 151*a*3, the protrusion plate part 151*b*, the second base part 151*c*, the main mounting surface 151*c*1, the connection surface 151*c*2, and the tip bending part 151*d* of the second terminal 152α, respectively. These overlapping components are not explained.

The coil device 110*a* according to the present embodiment also demonstrates effects similar to those of the coil device 110 according to Second Embodiment.

Fourth Embodiment

A coil device according to Fourth Embodiment of the present invention is different from the coil device according to First, Second, or Third Embodiment mentioned above only in the following structure and demonstrates effects similar to those of First, Second, or Third Embodiment. The overlapping matters with First, Second, or Third Embodiment are not explained. In the figures, common components with First to Third Embodiments are given common references.

Figure 6A:
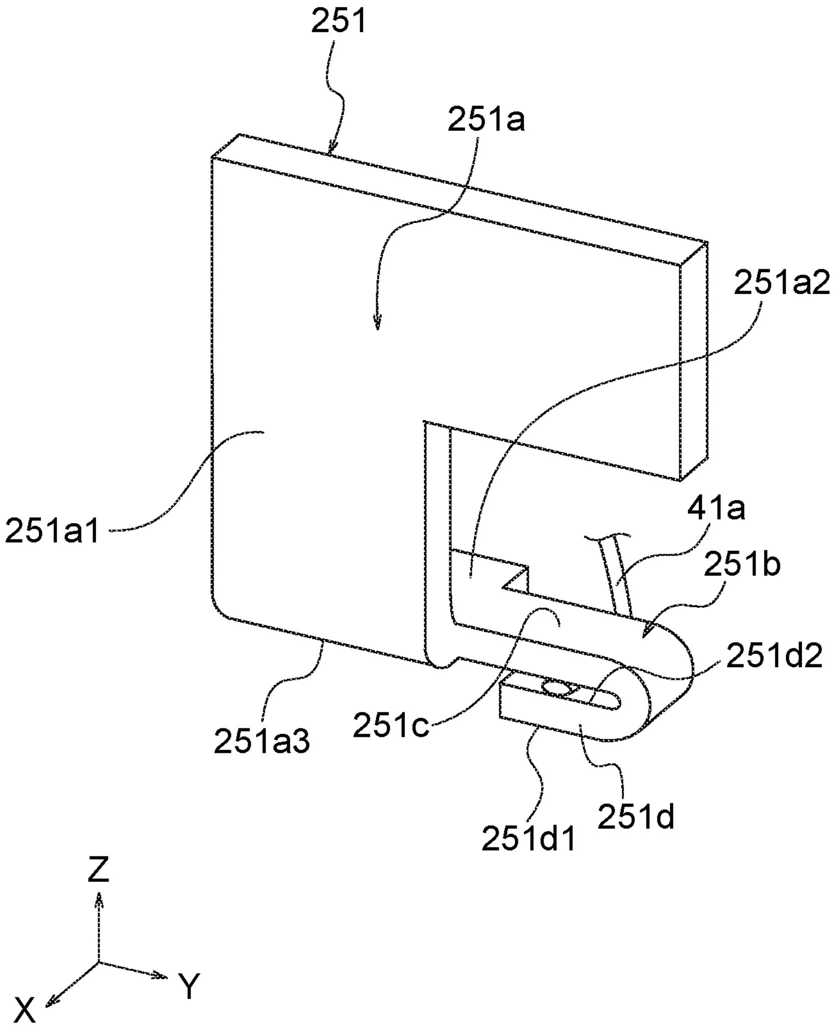
FIG. 6A is a perspective view of a terminal bracket used for a coil device according to further another embodiment of the present invention.

As shown in FIG. 6A, a first terminal 251 used for the coil device according to the present embodiment is a modified example of the first terminal 51 shown in FIG. 3 and is structured as below.

The first terminal 251 is structured by a conductive terminal plate or so and includes a terminal body 251*a* and a protrusion plate part 251*b* formed by bending a sheet of conductive plate-like member of a metal plate or so. The terminal body 251*a* includes an outer-end-surface contact portion 251*a*1 with a substantially L shape attached to one terminal attachment surface 24*c*1 formed on the outer end surface 24*c* of the flange 24 shown in FIG. 2 using adhesive or so. In addition, the terminal body 251*a* includes a mounting-side contact portion 251*a*2 with a rectangular plate shape formed by bending from the lower end of the outer-end-surface contact portion 251*a*1 in the Z-axis direction to the X-axis direction.

The outer-end-surface contact portion 251*a*1 of the terminal body 251*a* shown in FIG. 6A is fixed to the terminal attachment surface 24*c*1 of the flange 24 shown in FIG. 2 using adhesive or so. The mounting-side contact portion 251*a*2 shown in FIG. 6A is contacted with the mounting-side core surface 24*a* shown in FIG. 2 with a predetermined space (or no space). The outer surface of the mounting-side contact portion 251*a*2 located opposite to the surface contacted with the mounting-side core surface 24*a* shown in FIG. 2 is a sub-mounting surface 251*a*3. The role of the sub-mounting surface 251*a*3 is similar to that of the sub-mounting surface 51*a*3 shown in FIG. 3.

The protrusion plate part 251*b* shown in FIG. 6A and protruding outward in the Y-axis direction from the mounting-side core surface 24*a* of the flange 24 at the lower end of the flange 24 shown in FIG. 2 is formed integrally with the mounting-side contact portion 251*a*2 of the terminal body 251*a* shown in FIG. 6A. The protrusion plate part 251*b* includes a base part 251*c* being flush with the mounting-side contact portion 251*a*2 of the terminal body 251*a* and extending outward in the Y-axis direction and a tip bending part 251*d* bending downward in turn back manner in the Z-axis direction from the tip of the base part 251*c*.

In the present embodiment, the tip bending part 251*d* bends downward in the Z-axis direction and turns back at the tip of the base part 251*c*, the outer surface of the tip bending part 251*d* located opposite to the base part 251*c* is a main mounting surface 251*d*1, and the inner surface of the tip bending part 251*d*, where the base part 251*c* is located, is a connection surface (wire connection surface) 251*d*2. A lead end 41*a* (one lead end) of a first wire 41 (one wire) constituting the coil unit 40 is sandwiched and caulked by the connection surface 251*d*2 of the tip bending part 251*d* and the base part 251*c*. After the caulking, the terminal 251 and the lead end 41*a* of the wire 41 may be connected by soldering, laser welding, etc.

In the present embodiment, the main mounting surface 251*d*1 of the first terminal 251 protrudes downward in the Z-axis direction from the sub-mounting surface 251*a*3, and the main mounting surface 251*d*1 is mainly connected to a circuit pattern of an external circuit board (not shown), but the sub-mounting surface 251*a*3 may also be connected to the circuit pattern at the same time. The connection to the circuit pattern of the external circuit board is carried out in any manner, such as solder connection.

In the present embodiment, the connection surface 251*d*2 (wire connection surface) and the main mounting surface 251*d*1 are formed on the front surface and the rear surface of the tip bending part 251*d* of the first terminal 251, respectively.

Incidentally, the second terminal used for the coil device according to the present embodiment is symmetrical to the first terminal 251 in terms of shape and has the same structure excluding the symmetry.

Figure 6B:
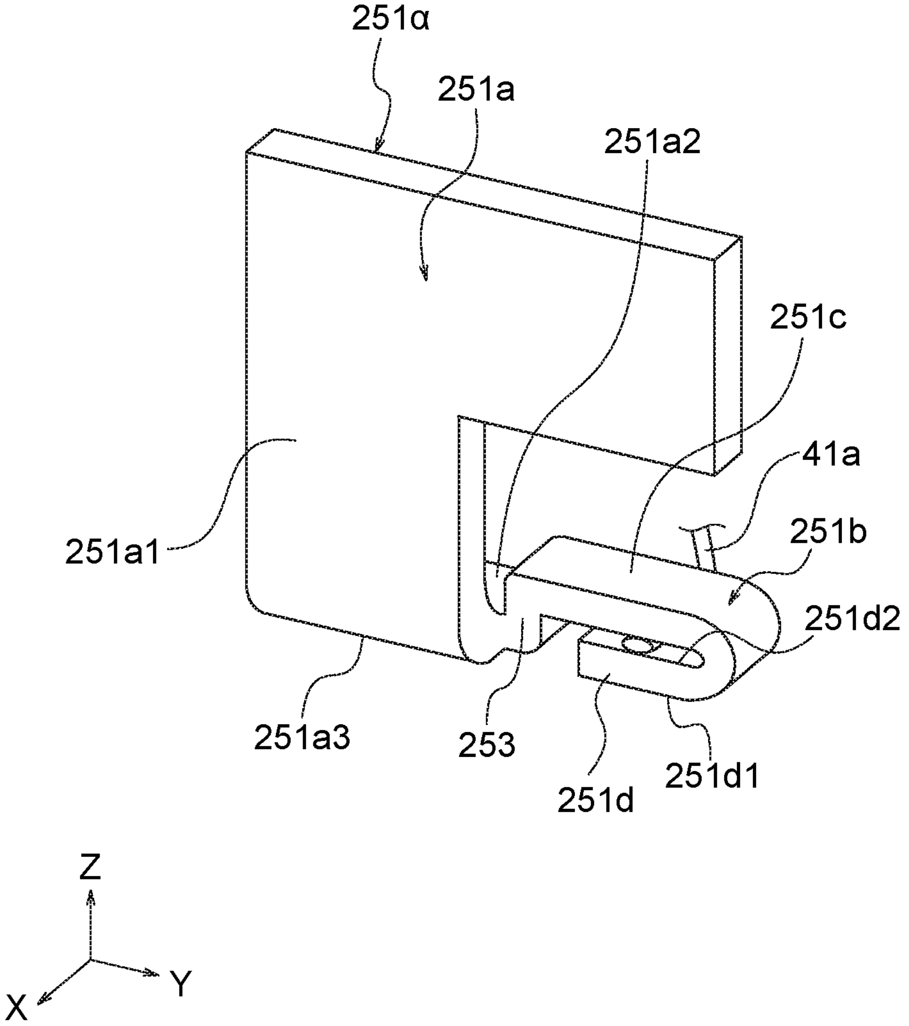
FIG. 6B is a perspective view of a terminal metal fitting used for a coil device according to further another embodiment of the present invention.

A first terminal 251*a* shown in FIG. 6B is a modified example of the first terminal 251 according to the present embodiment. In the first terminal 251*a* according to the present embodiment, a step 253 is integrally formed between the mounting-side contact portion 251*a*2 and the base part 251*c*, and the upper surface of the base part 251*c* is higher than that of the mounting-side contact portion 251*a*2 in the Z-axis direction. As a result, the main mounting surface 251*d*1 of the tip bending part 251*d* is substantially flush with the sub-mounting surface 251*a*3.

Figure 6C:
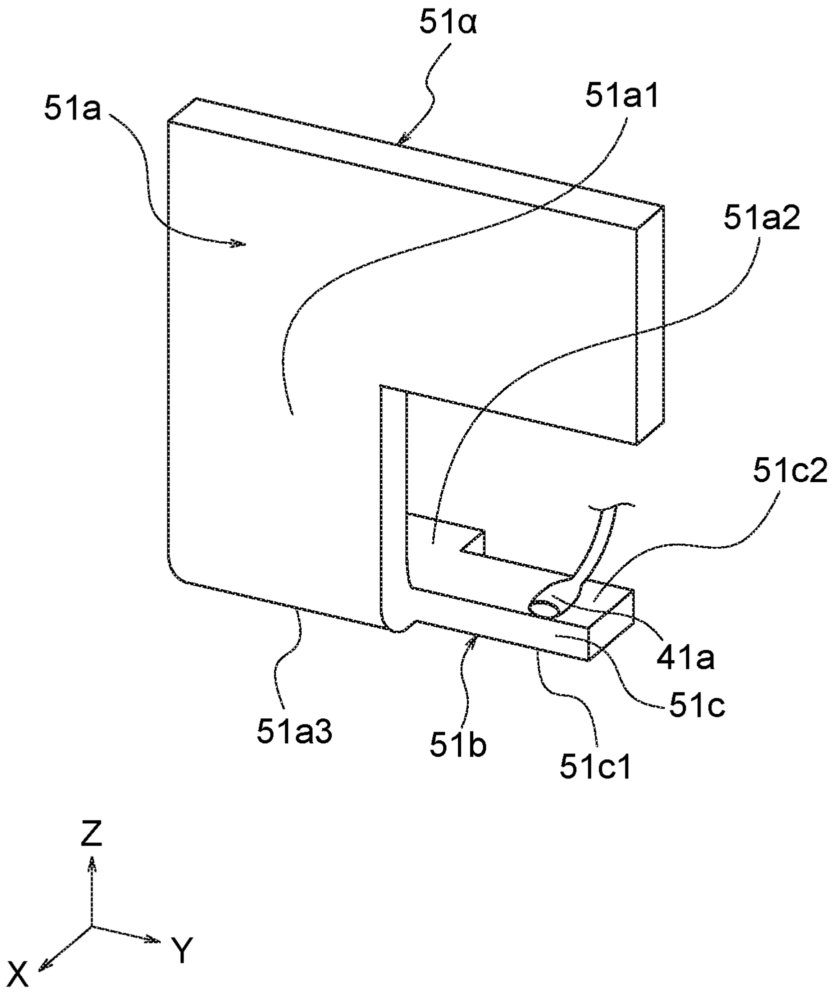
FIG. 6C is a perspective view of a terminal metal fitting used for a coil device according to further another embodiment of the present invention.

FIG. 6C illustrates another modified example of the first terminal 51 shown in FIG. 3. In this modified example, the tip bending part 51*d* shown in FIG. 3 is not formed on the protrusion plate part 51*b*, and the lead end 41*a* of the first wire is directly connected to the connecting surface 51*c*2 of the base part 51*c* by laser welding, soldering, heat welding, or the like.

Incidentally, the present invention is not limited to the above-mentioned embodiments and can variously be modified within the scope of the present invention.

In the above-mentioned embodiments, for example, the first flange 24 and the second flange 26 have the same structure, but may have different structures. The width of the notches 24*c*3 in the Y-axis direction formed at the lower ends of the flange 24 (26) of the drum core 20 shown in FIG. 2 on both sides in the Y-axis direction may be large. For example, the notches 24*c*3 on both sides may be connected to each other in the Y-axis direction. In this case, the mounting-side core surface 24*a* (26*a*) of the flange 24 (26) of the drum core 20 shown in FIG. 2 is flush with the bottom surface of the notches 24*c*3 (26*c*3).

In the above-mentioned embodiments, the plurality of wires (the first wire 41 and the second wire 42) is wound around the winding core 22 of the drum core 20. In the present invention, however, a single wire (e.g., only the first wire 41) may be wound around the winding core 22 of the drum core 20. In this case, the lead ends 41*a* and 41*b* on both ends of the first wire 41 are connected to any of the first terminal 51, 51*a*, 151, 151*a*, 251, or 251*a* attached to the flanges 24 and 26. The lead end 41*a* (one lead end) of the first wire 41 may be connected to the first terminal attached to the flange 24, and the lead end 41*b* (the other lead end) may be connected to the second terminal attached to the flange 26.

In the above-mentioned embodiments, the first terminal and the second terminal attached to each of the flanges 24 and 26 are insulated from each other, but when a single wire (e.g., only the first wire 41) is wound around the winding core 22 of the drum core 20, the first terminal and the second terminal attached to the same flange 24 (26) may electrically be connected to each other. That is, the first terminal and the second terminal attached to the same flange 24 (26) may be formed integrally from a sheet of metal plate.

DESCRIPTION OF THE REFERENCE NUMERICAL

10, 110, 110*a* . . . coil device
20 . . . drum core
22 . . . winding core
24 . . . first flange
24*a* . . . mounting-side core surface
24*b* . . . anti-mounting-side core surface
24*c* . . . outer end surface
24*c*1 . . . terminal attachment surface
24*c*2 . . . terminal insulation projection
24*c*3 . . . notch
24*d* . . . inner surface
24*e* . . . lateral surface
26 . . . second flange

26*a* . . . mounting-side core surface
26*b* . . . anti-mounting-side core surface
26*c* . . . outer end surface
26*c*1 . . . terminal attachment surface
26*c*3 . . . notch
26*d* . . . inner surface
26*e* . . . lateral surface
30 . . . flat plate-like member
40 . . . coil unit
41 . . . first wire
41*a* . . . one lead portion (lead end)
41*b* . . . the other lead portion (lead end)
42 . . . second wire
42*a* . . . one lead portion (lead end)
42*b* . . . the other lead portion (lead end)
51, 51*a*, 151, 151*a*, 251, 251*a* . . . first terminal (terminal fitting)
51*a*, 151*a*, 251*a* . . . terminal body
51*a*1, 151*a*1, 251*a*1 . . . outer-end-surface contact portion
51*a*2, 151*a*2, 251*a*2 . . . mounting-side contact portion
51*a*3, 151*a*3, 251*a*3 . . . sub-mounting surface
151*a*4 . . . lateral contact portion
51*b*, 151*b*, 251*b* . . . protrusion plate part
51*c*, 251*c* . . . base part
51*c*1, 151*c*1, 251*d*1 . . . main mounting surface
51*c*2, 151*c*2, 251*d*2 . . . connection surface (wire connection surface)
151*c* . . . second base part
51*d*, 151*d*, 251*d* . . . tip bending part
151*e* . . . first base part
253 . . . step
52, 152, 152*a* . . . second terminal (terminal fitting)
52*a*, 152*a* . . . terminal body
52*a*1, 152*a*1 . . . outer-end-surface contact portion
52*a*2, 152*a*2 . . . mounting-side contact portion
52*a*3, 152*a*3 . . . sub-mounting surface
152*a*4 . . . lateral contact portion
52*b*, 152*b* . . . protrusion plate part
52*c* . . . base part
52*c*1, 152*c*1 . . . main mounting surface
52*c*2, 152*c*2 . . . connection surface (wire connection surface)
152*c* . . . second base part
52*d*, 152*d* . . . tip bending part
152*e* . . . first base part

What is claimed is:

1. A coil device comprising:
a winding core made of a magnetic material;
a flange integrated with the winding core;
a wire wound around the winding core; and
a terminal fitting attached to a part of an outer surface of the flange, wherein
the terminal fitting includes:
a contact part contacted with the outer surface of the flange; and
a protrusion plate part integral with the contact part and protruding away from the flange, and
the protrusion plate part includes:
a wire connection surface to which a lead end of the wire is connected; and
a main mounting surface opposite to the wire connection surface and configured to physically contact a surface of an external circuit.

2. The coil device according to claim 1, wherein
the protrusion plate part includes:
a base part continuing to the contact part and protruding from the flange, and
a tip bending part bending in turn back manner at a tip of the base part; and
the lead end of the wire is sandwiched between the tip bending part and the base part.

3. The coil device according to claim 2,
wherein the wire connection surface or the main mounting surface is on a front surface or a rear surface of the tip bending part.

4. The coil device according to claim 2, wherein the wire connection surface is on an inner surface of the base part, and the main mounting surface is on an outer surface of the base part.

5. The coil device according to claim 1, wherein a sub-mounting surface is on a part of an outer surface of the contact part, the sub-mounting surface being flush with the main mounting surface or being on an inner side of the main mounting surface.

6. The coil device according to claim 1, wherein a gap distance between the protrusion plate part and the flange in a perpendicular direction to the main mounting surface is twice or larger than a thickness of the protrusion plate part at a location where the lead end of the wire is connected to the protrusion plate part.

7. The coil device according to claim 1, wherein a plate-like member is bonded on the outer surface of the flange opposite to the main mounting surface.

8. A coil device comprising:
a winding core made of a magnetic material;
a flange integrated with the winding core;
a wire wound around the winding core; and
a terminal fitting attached to a part of an outer surface of the flange, wherein
the terminal fitting includes:
a contact part contacted with the outer surface of the flange; and
a protrusion plate part integral with the contact part and protruding away from the flange,
the protrusion plate part includes:
a wire connection surface to which a lead end of the wire is connected; and
a main mounting surface opposite to the wire connection surface and being connectable to an external circuit, and
a sub-mounting surface is on a part of an outer surface of the contact part, the sub-mounting surface being flush with the main mounting surface or being on an inner side of the main mounting surface.

* * * * *